No. 632,760. Patented Sept. 12, 1899.
G. W. SLEEPER.
MOLD FOR CREASING AND FLANGING INSOLES.
(Application filed May 5, 1898.)
(No Model.) 2 Sheets—Sheet 1.
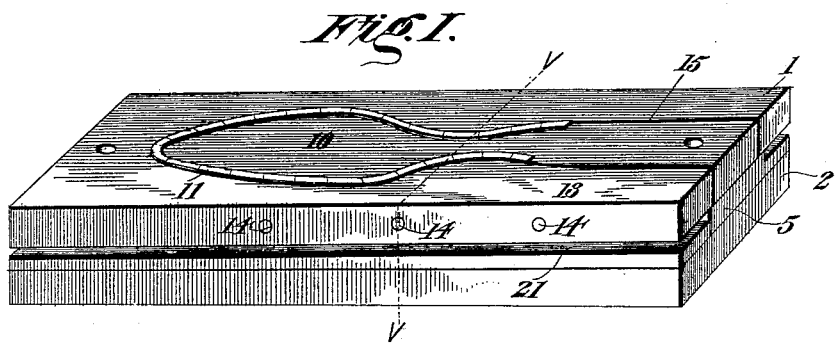
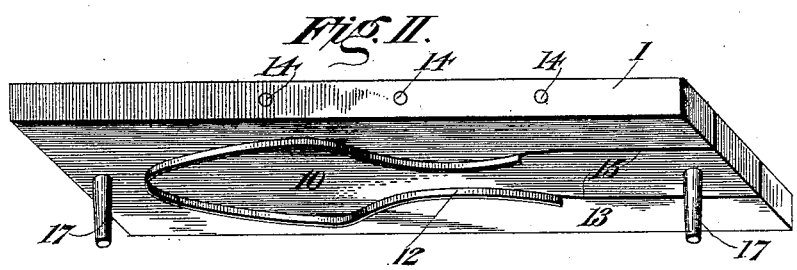
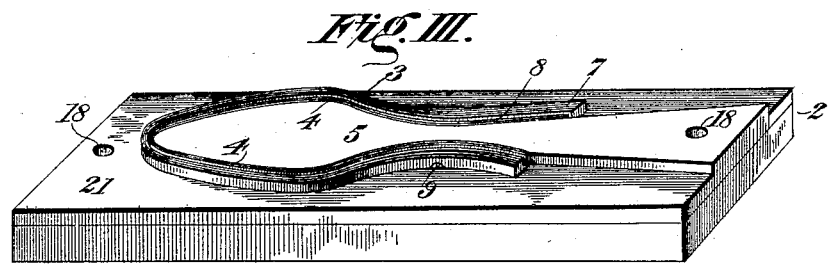
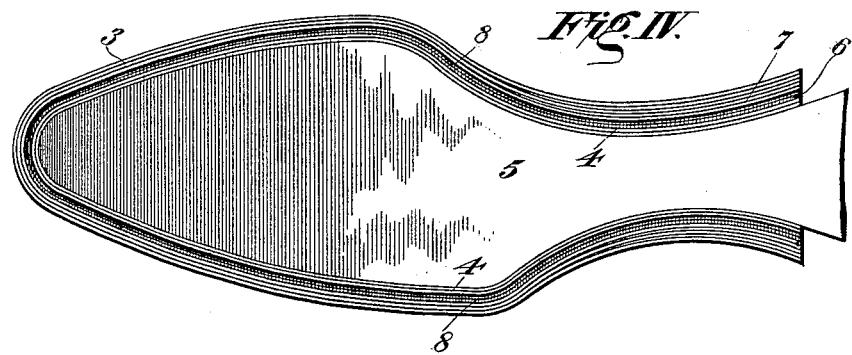
Witnesses:
M. E. Fowler
Stephen A. Brooks
Inventor:
George W. Sleeper
By Joseph T. Atkins
Attorney No. 632,760. Patented Sept. 12, 1899.
G. W. SLEEPER.
MOLD FOR CREASING AND FLANGING INSOLES.
(Application filed May 5, 1898.)
(No Model.) 2 Sheets—Sheet 2.
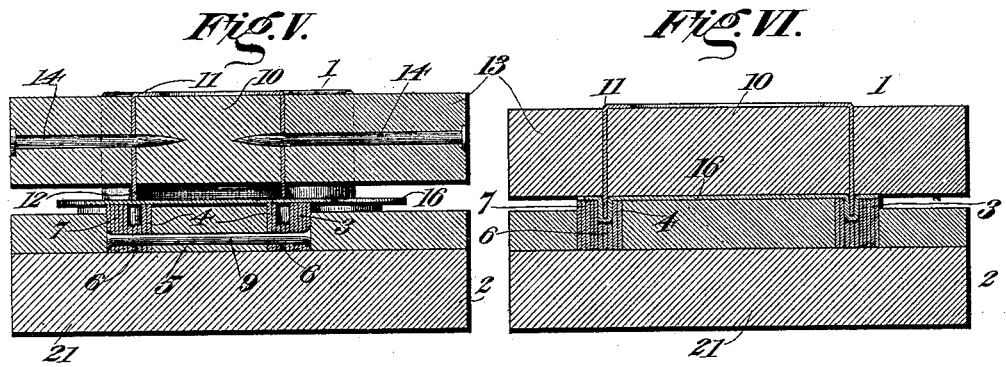
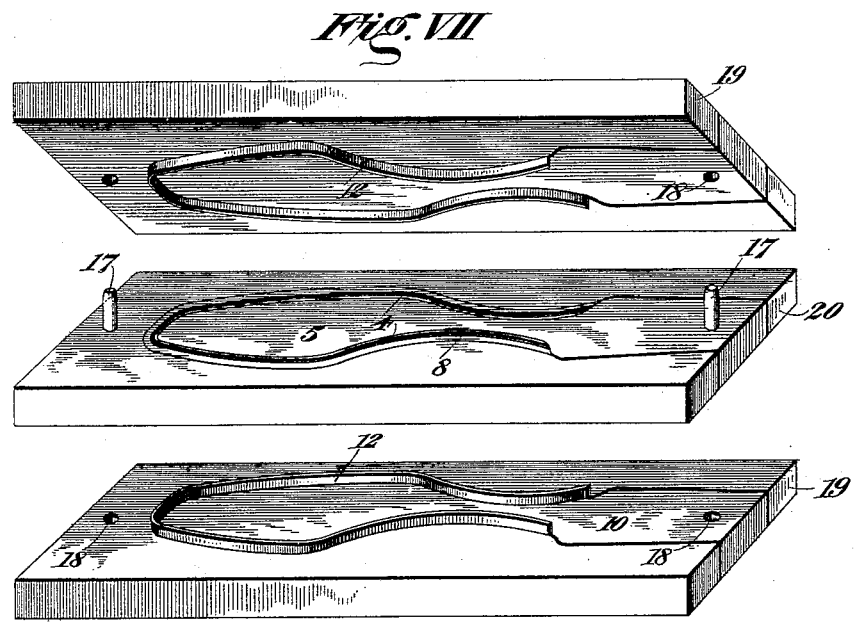
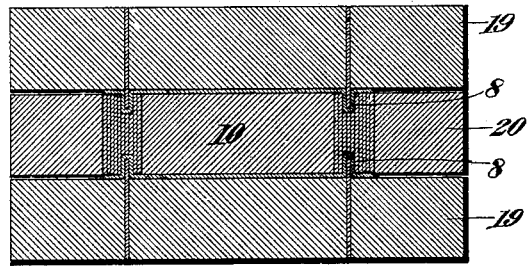

UNITED STATES PATENT OFFICE.

GEORGE W. SLEEPER, OF DETROIT, MICHIGAN, ASSIGNOR TO THE SLEEPER PATENT FLEXIBLE INSOLE COMPANY OF DETROIT, OF MICHIGAN.

MOLD FOR CREASING AND FLANGING INSOLES.

SPECIFICATION forming part of Letters Patent No. 632,760, dated September 12, 1899.

Application filed May 5, 1898. Serial No. 679,758. (No model.)

*To all whom it may concern:*

Be it known that I, GEORGE W. SLEEPER, of Detroit, in the county of Wayne, State of Michigan, have invented certain new and useful Improvements in Molds for Creasing and Flanging Insoles, of which the following is a complete specification, reference being had to the accompanying drawings.

The object of my invention is to improve and cheapen apparatus for creasing and flanging insoles for shoes.

To these ends the invention consists in male and female dies formed of flat strips of suitable material, preferably steel or iron. The male die may consist of a single strip. The female die, which is grooved, is a laminated structure composed of a series of flat strips secured together. The inner and outer strips are preferably of equal width and one or more intermediate strips are of less width, whereby a recess or groove is formed in one or both faces of the die.

The invention will be described in detail in connection with the accompanying drawings, in which—

Figure I is a perspective view of an apparatus for creasing a single insole. Fig. II is a perspective view of the upper or male die. Fig. III is a similar view of the lower die. Fig. IV is a plan view of the female die removed from the block. Fig. V is a section on the line V V of Fig. I. Fig. VI is a section illustrating the method of operation. Fig. VII illustrates the three parts of an apparatus for creasing two insoles at one operation, and Fig. VIII is a transverse section through the double mold when closed.

Referring to Figs. I to VI, inclusive, 1 indicates the male member of a single mold, and 2 the female member. The female die 3 is constructed of a series of flat strips, which are suitably connected together, preferably by sweating or soldering them. As best shown in Figs. IV and V, the female die is constructed of inner strips 4, which are fitted to a form 5. Surrounding the strips 4 are a series of narrower strips 6, and surrounding these are a series of wide strips 7. The wide strips 4 and 7 form the sides of a groove 8 and the strips 6 form the bottom of the groove. It will be evident that one or more of each of the strips 4, 6, and 7 may be used, depending upon their thickness and the class of work for which the dies are intended. The mode of construction consists in bending the strips to conform to the form 5 and then sweating them together into a solid mass. In this manner I am enabled to form at slight expense a female die which is very strong and satisfactory. The strips may be of any suitable material, preferably of steel or iron. After sweating them together the die is suitably smoothed and finished. The laminated die thus formed may be used separately; but it is preferably connected to a solid inner form 5 by pins or rivets 9, as shown in Fig. V, and the die is then set in a block 21, the die and block constituting one member of the apparatus. The male member of the apparatus comprises an inner form 10 and a band 11, which conforms thereto and projects below, forming a flange 12, corresponding in outline to the groove 8 of the female die. The form 10 and band 11 are preferably fitted in a block 13, the three parts constituting the male member of the apparatus. The parts are held together in any suitable manner, such as by the pins 14. The male die may be formed by cutting a kerf 15 in the block 13 and fitting the band 11 in the kerf. As shown, the upper edge of the band is folded in upon the frame 10, the edge being slit to permit of folding on the curved lines, as shown in Fig. I. Suitable means are provided to register the male and female dies. As shown, this is accomplished by means of pins 17 in one of the members which fit holes 18 in the other member.

In Figs. VII and VIII I have shown the preferred form of my apparatus, in which two male members 19 are used and a double female member 20. The construction of the male members may be exactly similar to that above described. The construction of the female member is also similar to that previously described, excepting that grooves 8 are formed in both the upper and lower edges of the die. The female die, having two grooves, is as inexpensive to form as the die having a single groove, and by its use a pair of insoles can be made at a single operation, thus effecting a considerable saving in labor and securing an absolute correspondence between the right and left insoles.

The mode of operation is illustrated in Figs. V and VI. A suitably-shaped piece 16, of leather or other fabric, which is to form the insole is placed between the upper and lower members, as illustrated in Fig. V, and the members are then pressed together, the flange 12 creasing the fabric and forcing it into the groove 8, as illustrated in Fig. VI.

What I claim is—

1. In an apparatus for forming insoles, a die consisting of a series of metal strips suitably shaped, and sweated together, substantially as described.

2. In an apparatus for forming insoles, a female die consisting of inner and outer strips of suitable width, and intermediate strips of less width, all suitably connected together, substantially as described.

3. In an apparatus for forming insoles, a female die consisting of suitably-shaped inner and outer strips of suitable width, and intermediate strips of less width, the intermediate strips being arranged symmetrically with respect to the other strips, whereby grooves are formed between the inner and outer strips, all of said strips being suitably secured together, substantially as set forth.

4. In an apparatus for forming insoles, a female member comprising an inner form, a laminated die, having suitable grooves, secured to said form, and a block surrounding said die, substantially as set forth.

In testimony of all which I have hereunto subscribed my name.

GEORGE W. SLEEPER.

Witnesses:
O. F. OETERS,
WM. L. MORRISON.